United States Patent
Farrington

[19]

[11] Patent Number: 5,967,461
[45] Date of Patent: Oct. 19, 1999

[54] HIGH EFFICIENCY ENVIRONMENTAL CONTROL SYSTEMS AND METHODS

[75] Inventor: Franklin D. Farrington, Long Beach, Calif.

[73] Assignee: McDonnell Douglas Corp., Hazelwood, Mo.

[21] Appl. No.: 08/887,018

[22] Filed: Jul. 2, 1997

[51] Int. Cl.⁶ .................................................. B64D 11/00
[52] U.S. Cl. ......................... 244/118.5; 244/58; 454/74; 454/76; 454/115; 454/141
[58] Field of Search .................... 244/58, 53 R, 244/118.5; 454/74, 69, 70, 71, 72, 75, 76, 113, 141; 60/39.142, 39.141, 39.07

[56] References Cited

U.S. PATENT DOCUMENTS

| | | |
|---|---|---|
| 2,391,838 | 12/1945 | Kleinhans et al. . |
| 2,453,923 | 11/1948 | Mayo . |
| 2,734,443 | 2/1956 | Wood .................................. 244/118.5 |
| 2,777,301 | 1/1957 | Khun .................................... 244/118.5 |
| 2,870,698 | 1/1959 | Best . |
| 3,326,109 | 6/1967 | Markham . |
| 3,369,777 | 2/1968 | Furlong . |
| 4,261,416 | 4/1981 | Hamamoto ........................... 244/118.5 |
| 4,419,926 | 12/1983 | Cronin et al. . |
| 4,546,939 | 10/1985 | Cronin ................................. 244/118.5 |
| 5,125,597 | 6/1992 | Coffinberry . |
| 5,143,329 | 9/1992 | Coffinberry ......................... 244/118.5 |
| 5,145,124 | 9/1992 | Brunskill ............................. 244/118.5 |
| 5,299,763 | 4/1994 | Bescoby et al. .................... 244/118.5 |
| 5,442,905 | 8/1995 | Claeys et al. . |
| 5,482,229 | 1/1996 | Asshauer ............................. 244/118.5 |
| 5,490,645 | 2/1996 | Woodhouse . |
| 5,813,630 | 9/1998 | Williams ............................. 244/118.5 |

FOREIGN PATENT DOCUMENTS

| | | | |
|---|---|---|---|
| 2076897 | 12/1981 | United Kingdom | ............... 244/118.5 |
| 2125956 | 3/1984 | United Kingdom | ............... 244/118.5 |
| 2202933 | 10/1988 | United Kingdom | ............... 244/118.5 |

*Primary Examiner*—Galen L. Barefoot
*Attorney, Agent, or Firm*—Brooks & Kushman PC

[57] ABSTRACT

A high efficiency environmental control system uses air exhausted from a pressurized cabin to cool compressed air entering the cabin. Air exhausted from the cabin may flow directly from the cabin through a heat exchanger which cools the compressed air entering the cabin. Alternatively, air exiting the cabin may flow through a turbine which expands and cools the air prior to passing through the heat exchanger. The turbine may be used to drive a compressor to provide the compressed air to the cabin. Supplemental power to drive the compressor may be provided by a second turbine driven by bleed air from one or more turbine engines, or by an electric motor. Bleed air may also be mixed with air from the compressor to provide fresh air to the cabin. To further increase efficiency and meet the cooling requirements of the cabin on the ground and at altitude, switch dampers may be employed to selectably vary the flow path of air supplied to the cabin.

17 Claims, 7 Drawing Sheets

HIGH EFFICIENCY ENVIRONMENTAL CONTROL SYSTEMS AND METHODS

TECHNICAL FIELD

The present invention relates to high efficiency environmental control systems for vehicles powered by turbine engines which recover energy from air exiting a controlled pressurized space.

BACKGROUND ART

A common approach to environmental control system design for vehicles using turbo machines is based on the air cycle machine or "pack". The pack outputs cool air at a pressure sufficient to move the air through distribution ducts and at a rate sufficient to satisfy the fresh air needs of the occupants (while also compensating for intentional and unintentional outward leaks). The air cycle machine is said to emulate the "air-standard refrigeration cycle" found in thermodynamic texts. However, differences exist which provide the opportunity for increasing efficiency of the traditional air cycle machine approach.

The typical air cycle machine extracts an amount of "bleed air" from the engine core compressor ports, such as the eighth stage (low stage bleed air) or fourteenth stage (high stage bleed air). The bleed air is compressed or pressurized and as a result heated to a very high temperature relative to ambient. The bleed air is then passed through a compressor which further increases the temperature and pressure. Ram air flow is used to cool the compressed bleed air before it is expanded and further cooled in a turbine to an appropriate temperature and pressure to operate a water separateor and cool the controlled space, generally referred to herein as the cabin.

In terms of engine fuel consumption, bleed air is very expensive. For example, in a typical aircraft application cruising at 35,000 feet, one pound per second (pps) of low stage bleed air costs the same as 158 kilowatts (211 hp) of shaft power extracted from a gearbox coupled to the engine: 1.2% specific fuel consumption (SFC). Furthermore, fan air used to precool the bleed air before passing it to the compressor may add an additional 0.52% SFC. As such, it is desirable to reduce or eliminate the use of bleed air to increase efficiency of the environmental control system. Alternatively, it is desirable to fully utilize the energy of the bleed air.

For aircraft applications, cabin or fuselage pressure is regulated by restricting outflow of air through an outflow valve. The outflow valve has an open area modulated to provide a desired pressure. To maintain a constant cabin pressure level, the rate of air supplied must equal the rate of air leaked plus the rate of air exhausted through the outflow valve. In an attempt to recover energy from the outflow air by converting it to forward thrust, the outflow valve is carefully shaped to form a converging-diverging supersonic nozzle since the pressure ratio allows an exit Mach number of about 1.6 in a single process. The actual savings in % SFC are difficult to isolate and measure due to various factors, such as the possibility of creating an adverse yaw moment which requires rudder compensation thereby leading to additional aerodynamic drag. As such, it is desirable to provide an alternative approach to energy recovery to improve the efficiency of the environmental control system.

DISCLOSURE OF THE INVENTION

A general object of the present invention is to improve the efficiency of an environmental control system for a pressurized cabin, such as those typical of aircraft. This object is accomplished by recovering energy from the air exhausted from the cabin using a variety of alternative environmental control system configurations.

In carrying out the above object and other objects, features, and advantages of the present invention, a high efficiency environmental control system is disclosed. The system includes a heat exchanger which uses air exhausted from the cabin to cool air supplied to the cabin. The system may be configured in any of a number of alternative embodiments to realize the features and advantages of the present invention to recover energy from air exhausted from a pressurized space. Various embodiments employ alternative configurations which are selectively utilized based on current cooling demands to further improve system efficiency. In one embodiment, a heat exchanger having a first inlet and corresponding first outlet is placed in fluid communication with the outflow port of the cabin. The heat exchanger includes a second inlet and corresponding second outlet in fluid communication with the inflow port of the cabin. As such, air exhausted from the cabin passes through the first inlet and outlet of the heat exchanger to cool air supplied to the cabin through the second inlet and outlet to increase efficiency of the system. When cabin pressure is insufficient to attain a desired cooling level of air supplied to the inflow port of the cabin, a fan interposed the first inlet of the heat exchanger and the outflow port of the cabin may be used for moving air through the heat exchanger.

In a number of embodiments, air exiting the outflow port is passed through a turbine interposed the cabin and the heat exchanger such that the turbine expands and cools the air exhausted from the cabin to further cool the air supplied to the cabin through the second inlet and outlet of the heat exchanger. The turbine may be used to drive a compressor which is mechanically coupled to the turbine. The compressor receives ram air and compresses the ram air (relative to ambient) to provide compressed air to the compressor outlet. The compressed air is passed through the heat exchanger where it is cooled prior to entering the controlled space or cabin. To supply additional power for driving the compressor, one embodiment uses a second turbine which is mechanically coupled to the compressor. The second turbine receives bleed air from at least one engine and has an outlet in fluid communication with the heat exchanger. Alternatively, a motor may be coupled to the compressor for providing energy to drive the compressor. The motor receives electrical power from a generator coupled to one of the engines.

A number of advantages are associated with the present invention. For example, the present invention recovers energy from air exhausted from the cabin to improve efficiency of the environmental control system. The present invention provides a number of alternatives to reduce or eliminate the use of bleed air from one or more turbine engines. While particularly suited for aircraft applications, the present invention may be utilized for any application having a pressurized space or cabin.

While embodiments of this invention are illustrated and disclosed, these embodiments should not be construed to limit the claims. It is anticipated that various modifications and alternative designs may be made without departing from the scope of this invention.

BEST MODE FOR CARRYING OUT THE INVENTION

Figure 1:
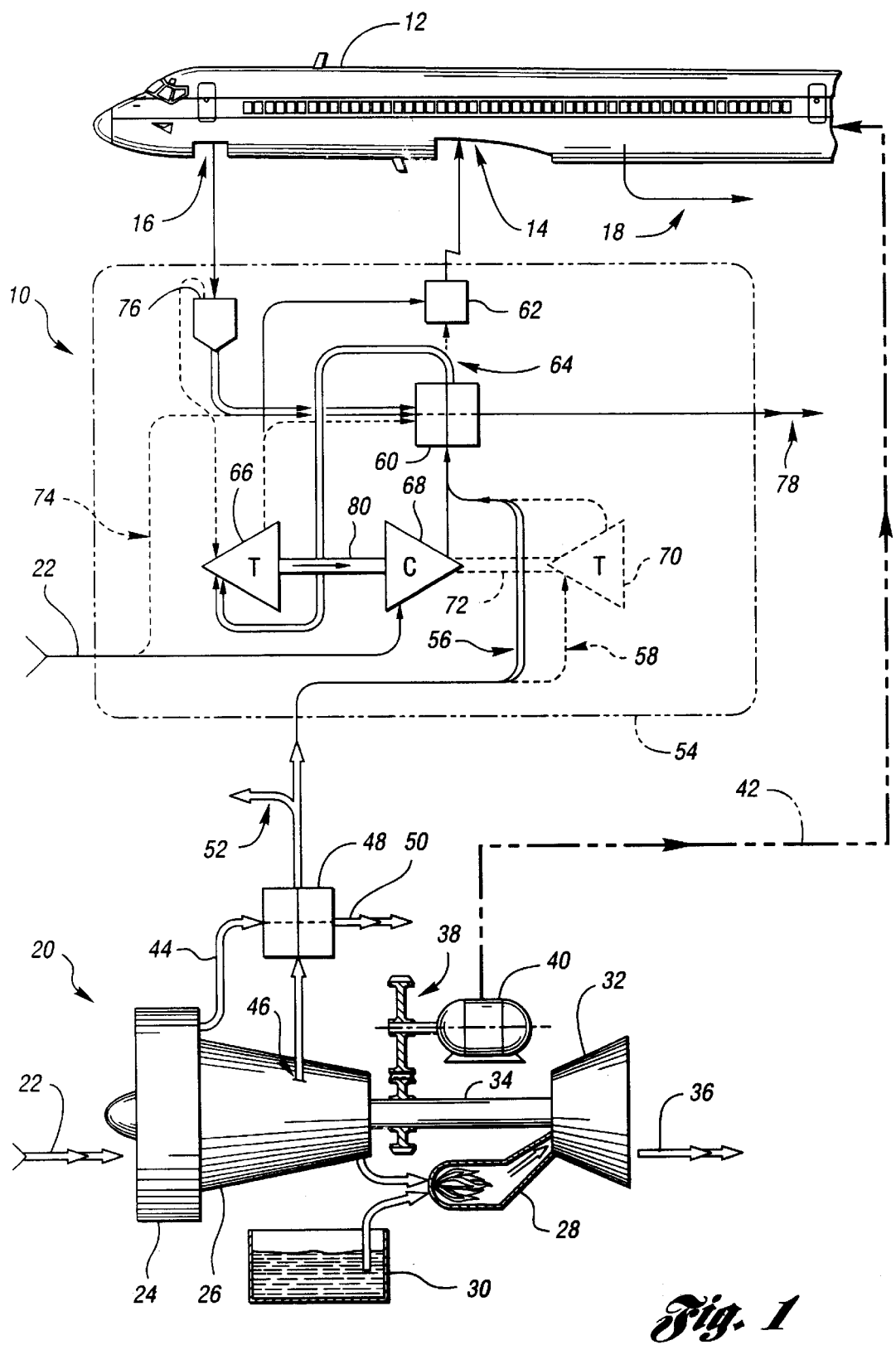
FIG. 1 is a schematic representation of one embodiment of the present invention referred to as a minimum bleed configuration where the dotted lines represent conditions allowing adequate low temperature air to be supplied to the water separator.

Referring now to FIG. 1, an environmental control system (ECS), indicated generally by reference numeral 10, is shown. ECS 10 provides fresh, pressurized or compressed air to a controlled space such as cabin 12. As used herein, cabin refers to the entire volume within the pressurized shell of an enclosed space such as the fuselage of an aircraft. In general, cabin 12 includes one or more inflow ports, indicated generally by reference numeral 14, for supplying fresh, pressurized air to cabin 12. The pressure within cabin 12 may be regulated by restricting the air exiting cabin 12 through an outflow port, indicated generally by reference numeral 16. Preferably, air passing through outflow port 16 is restricted by varying turbine parameters, as described in greater detail herein. However, an outflow valve may be used where required in combination with varying turbine inlet geometry. At a constant cabin pressure, the rate of air supplied through inflow port 14 must be equal to the air exhausted from cabin 12 through outflow port 16 in addition to air lost through leaks, indicated generally by reference numeral 18. The leaks represent both intentional and unintentional outward flow of air such as may occur through door seals, or pressure shell penetrations by tubes, wires, and the like. Throughout the drawings, double arrows are used to indicate air exhausted to atmosphere, or ambient.

ECS 10 is powered by at least one turbine engine 20. In one embodiment of the present invention, three such turbine engines are used to power an aircraft. Ram air, indicated generally by reference numeral 22, enters engine 20 through fan 24 before passing through multi-stage compressor 26. The compressed air is fed to a combustion chamber 28 where it is mixed with fuel from a fuel source 30. The combustion process is used to drive turbine 32 which is mechanically coupled by shaft 34 to compressor 26. The jet exhaust then passes to atmosphere as indicated generally by reference numeral 36.

A transmission or gear box 38 is mechanically coupled to shaft 34 to selectively drive a generator 40 which generates electrical power, generally indicated by reference numeral 42, to meet the electrical demands of the vehicle.

Air may be extracted from engine 20 from fan 24 as indicated by reference numeral 44 or from a bleed port 46.

Reference numeral 46 represents both high stage, and low stage bleed air. Typically, low stage bleed air is extracted from the eighth stage of multi-stage compressor 26 whereas high stage bleed air is extracted from the fourteenth stage of multi-stage compressor 26. The embodiment illustrated in FIG. 1 may be referred to as a minimum bleed configuration since the bleed air extracted is reduced from the prior art requirement of about 7.5 pounds (mass) per second (pps) to about 4 pps.

Bleed air (high stage or low stage) is extracted from bleed port 46 and passes through a pre-cooler 48 where it is cooled by fan air 44. Preferably, pre-cooler 44 is a cross-flow, non-mixing, air-to-air heat exchanger which exhausts the cross-flow air to atmosphere as indicated by reference numeral 50. Due to the reduced flow requirements, pre-cooler 48 need reject only about 345 kw as opposed to the prior art design which requires heat rejection of about 640 kw. As such, less air is required from fan 24 to achieve the required cooling. This may contribute to savings in percent SFC as described herein.

A portion of the air exiting pre-cooler 48 is diverted as indicated by reference numeral 52 to provide anti-ice functions for the aircraft. The remaining air flow is directed into one or more packs 54 for cooling prior to being supplied to cabin 12. Depending upon the particular application, an aircraft may have one pack associated with each engine, multiple engines associated with a single pack, or multiple packs associated with one or more engines. For purposes of describing the present invention, pack 54 represents one or more packs which satisfy the cooling and fresh air requirements for cabin 12. Air entering pack 54 may be routed through a first path, indicated generally by reference numeral 56, or a second path, indicated generally by reference numeral 58, depending upon the particular cooling demand and pressure differential between cabin 12 and ambient. The path indicated by solid lines 56 represents the path used to provide maximum cooling to an aircraft on a hot, humid day during a sea level climb.

As indicated in FIG. 1, path 56 routes bleed air from pre-cooler 48 to heat exchanger 60. Heat exchanger 60 includes a first inlet and corresponding first outlet in fluid communication with outflow port 16 of cabin 12. Heat exchanger 60 also includes a second inlet and corresponding second outlet in fluid communication with inflow port 14 of cabin 12. As such, air exhausted from cabin 12 passes through the first inlet and outlet of heat exchanger 60 to cool air supplied to cabin 12 through the second inlet and outlet to increase the efficiency of the system.

As indicated in FIG. 1, heat exchanger 60 may be alternatively placed in fluid communication with inflow port 14 of cabin 12 through water separator 62 either directly, as indicated by dashed line 64, or through turbine 66 depending upon the cooling demand of cabin 12.

A compressor 68 receives ram air 22 through a compressor inlet to provide compressed air at the compressor outlet which is mixed with bleed air from engine 20 before entering second inlet of heat exchanger 60. Compressor 68 is mechanically coupled to and driven by turbine 66. Compressor 68 may also be driven by a second turbine 70 which is mechanically coupled thereto via shaft 72 when operating in the high efficiency mode, such as during cruising at altitude. Second turbine 70 is driven by bleed air from engine 20 as indicated generally by reference numeral 58. As such, turbine 70 is selectively mechanically coupled to compressor 68 when functioning in the maximum efficiency or economy mode. The outlet of turbine 70 is then in fluid communication with the outlet of compressor 68 where air is mixed prior to entering the second inlet of heat exchanger 60.

To supply additional air flow through the first and second inlet and outlet of heat exchanger 60, ram air may be provided during economy mode through path 74. For maximum cooling, a low pressure fan 76 may be used to extract available cooling effect from air exiting cabin 12 through outflow port 16. In general, on a hot, humid day, the air exiting cabin 12 contains a significant amount of cooling effect which may be exploited via heat exchanger 60. Low pressure fan 76 is used to provide a sufficient air flow when a reduced pressure ratio exists between cabin 12 and atmosphere or ambient, such as typically occurs at or near sea level. Air exiting the first outlet of heat exchanger 60 is exhausted to ambient as indicated generally by reference numeral 78.

The minimum bleed configuration illustrated in FIG. 1 is based on providing the majority, if not all, of the cabin air from compression of ram air through compressor 68. The duty of such a compressor is constant in mass flow rate and requires pressure rises far smaller than those produced at the bleed stage of the engines. This approach recovers as much energy as possible from air exiting cabin 12 through outflow port 16. In the maximum economy mode, this air is passed through turbine 66 whose power is used to partially supply the energy to drive compressor 68 via shaft 80. As stated above, the outflow air has considerable available energy with respect to the outside ambient in most flight regimes other than at low altitudes. For example, considering a typical application at 35,000 feet altitude, a turbine 66 having an adiabatic efficiency of 80% would be able to recover 29.5 kw for each pps of air flow. For an inflow rate of about 6 pps at 35,000 feet, and a leak rate of about 1 pps, the energy available from the outflow air of about 5 pps can be recovered which amounts to around 150 kw. Use of turbine 66 also provides another serendipitous effect: the air exiting turbine 66 is significantly cooler than ambient air such that it serves as an excellent heat sink for the heat exchange process of pack 54. The additional power to drive compressor 68 may be provided by the selectably engageable turbine 70 or alternatively by a motor, as illustrated and described herein.

For the configuration illustrated in FIG. 1, representative calculations result in a required effectiveness for heat exchanger 60 of about 0.74 as opposed to the required effectiveness of the prior art configuration which exceeds 0.90. As such, heat exchanger 60 can be smaller than the existing heat exchanger resulting in attendant savings in manufacturing costs and fuel cost during operation.

At low altitudes in hot conditions, the high efficiency configuration indicated by dashed lines in FIG. 1 is modified to the maximum cooling configuration as indicated by the double solid lines of FIG. 1. Under these conditions, the exhaust air from the cabin still provides a better heat sink than the ambient air so low pressure fan 76 is included to move the exhaust air through heat exchanger 60. To achieve the low temperatures needed to dehumidify and handle the cooling loads, ram air is compressed by compressor 68 up to the bleed pressure and merged with bleed air prior to being cooled in heat exchanger 60. Turbine 66 is then used to expand and cool the supply air prior to entering water separator 62 and distribution ducts within cabin 12.

Computer simulations have been performed assuming isentropic efficiency of 80% for all turbo machines and 90% for the combined efficiency of gear box 38 and generator 40. The parameters (heat rate, effectiveness, and log-mean temperature difference) for heat exchanger 60 operations were determined and operating conditions adjusted as required to match predetermined boundary conditions. In this embodiment, a model CF6-80 jet engine manufactured by General Electric was utilized. Other assumptions used for the simulation were that the fan bleed generated by fan 24 for pre-cooler 48 was reduced proportional to the reduction in the rate of bleed air exiting port 46 and that a constant electric load of 165 kw was provided for miscellaneous electrical loads. This configuration was analyzed for climb and descent flight regimes at sea level, 10K, 20K, 30K, and 40K feet and cruise at 43K feet. The computer simulations indicate a potential fuel savings of 3.31% SFC at cruise levels.

Figure 2:
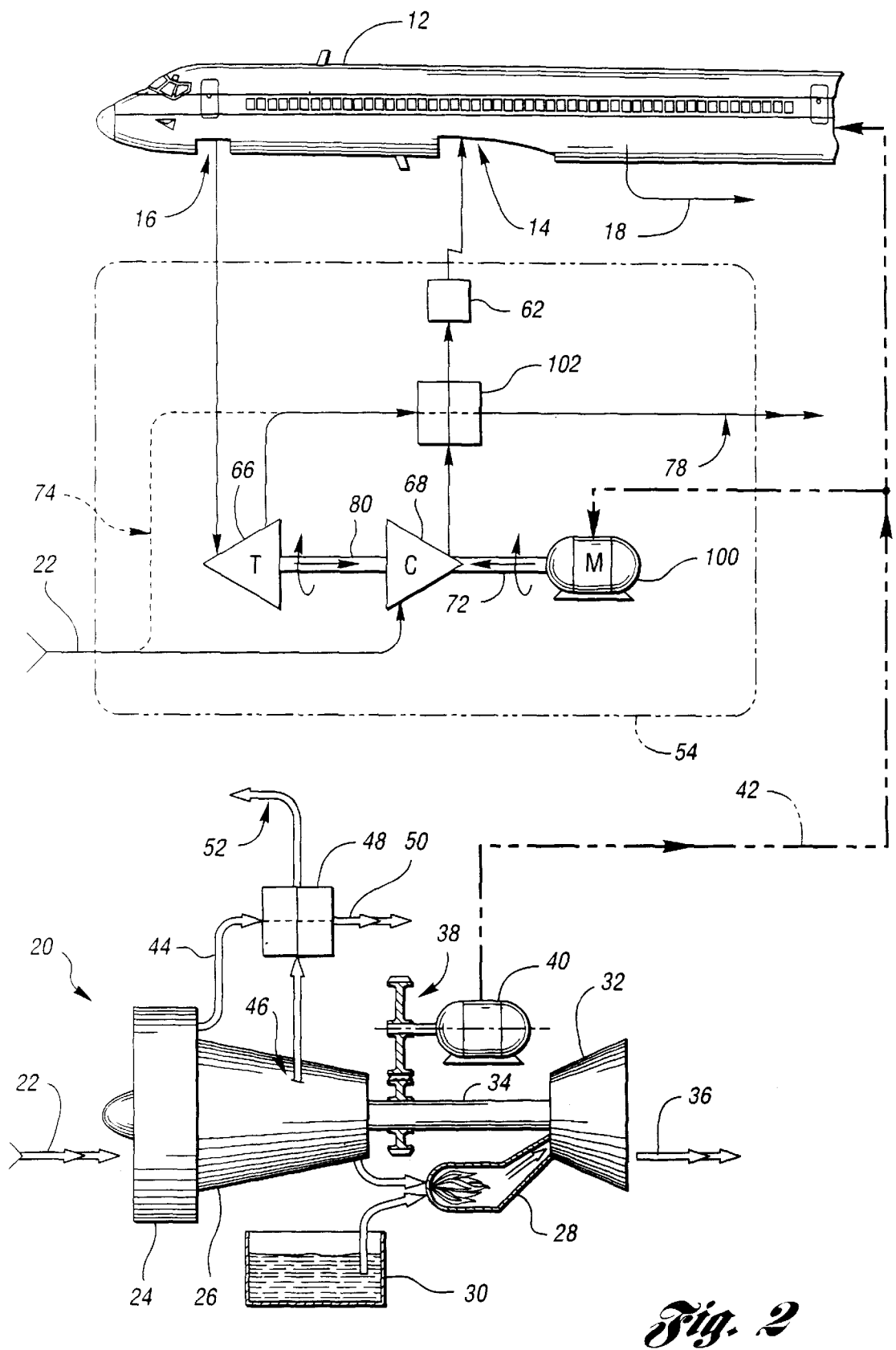
FIG. 2 is a schematic block diagram of another embodiment of the present invention referred to as an all-electric configuration.
Figure 3:
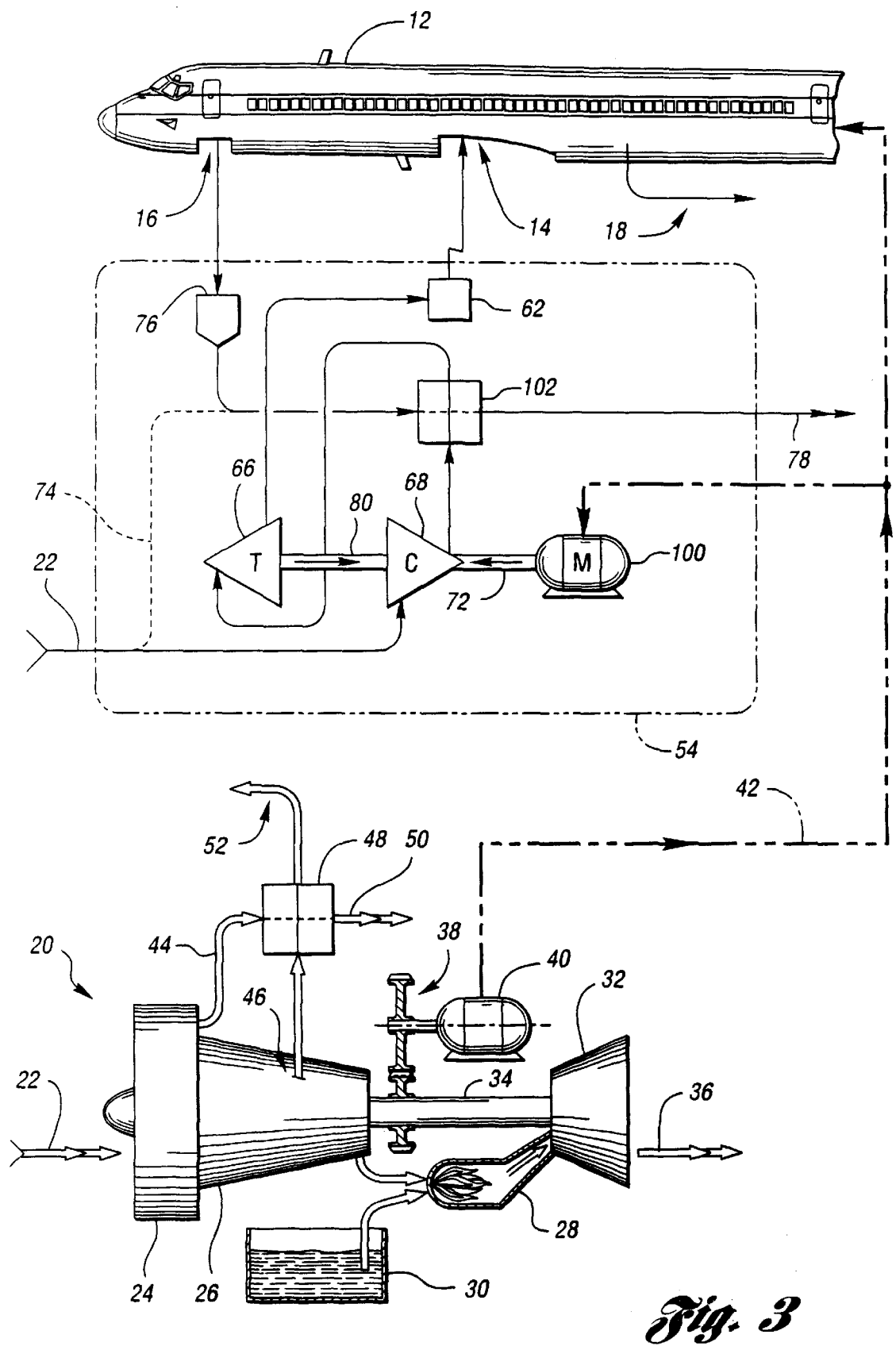
FIG. 3 is a schematic block diagram of another configuration for the present invention illustrating an all-electric configuration under maximum cooling demand.

Referring now to FIGS. 2 and 3, another embodiment of an environmental control system according to the present invention is shown. This embodiment may be referred to as an "all-electric" configuration since the use of bleed air from engine 20 has been eliminated. FIG. 2 illustrates the all-electric configuration having flows selectively arranged for maximum economy, while FIG. 3 illustrates the flows to achieve maximum cooling. Likewise, FIG. 2 is described using representative calculations for a 35,000 foot cruise, while FIG. 3 uses representative calculations for a hot day sea level climb. Like reference numerals indicate similarity of function for components illustrated and described with reference to FIG. 1. One of ordinary skill in the art will recognize that various flow rates, heat exchanger parameters, and other such considerations will vary depending upon the particular application. As such, the representative numbers found throughout the specification are provided to establish the viability of the various configurations under different operating conditions. The actual numbers may be ascertained for each particular application by one of ordinary skill in the art. For example, while pre-cooler 48 of FIGS. 2 and 3 appears schematically identical to pre-cooler 48 of FIG. 1, the pre-cooler of FIGS. 2 and 3 must provide less heat rejection since the bleed air has been eliminated from the ECS function. As such, bleed air through pre-cooler 48 of FIGS. 2 and 3 is provided only for the anti-ice function, indicated generally by reference numeral 52.

The all-electric configuration illustrated in FIGS. 2 and 3 may require a larger gear box 38 and generator 40 than the corresponding components of FIG. 1 to accommodate the increased electrical demand. For the maximum economy mode illustrated in FIG. 2, generator 40 must provide 165 kw of electrical power to cabin 12 in addition to approximately 143 kw of electrical power for motor 100 which is mechanically coupled to compressor 68 via shaft 72. Due to the approximate conversion efficiency of 90% used for motor 100, the 143 kw of electrical power is converted to about 129 kw of mechanical power transmitted to compressor 68 via shaft 72.

In the configuration of FIG. 2, compressor 68 pressurizes ram air 22 which passes through heat exchanger 102 where it is cooled using air exhausted from cabin 12 through outflow port 16. Turbine 66 is mechanically coupled to compressor 68 via shaft 80. Turbine 66 includes an inlet in fluid communication with outflow port 16 of cabin 12 and an outlet in fluid communication with a first inlet and corresponding first outlet of heat exchanger 102 to cool the air exiting compressor 68 and passing through a second inlet and corresponding second outlet of heat exchanger 102. Turbine 66 expands and cools air exhausted from cabin 12 to generate about 156 kw of mechanical power to drive compressor 68 via shaft 80. If required, additional ram air 22 may be provided via path 74 to the first inlet and outlet of heat exchanger 102 to increase the heat rejection. For this configuration, heat exchanger 102 rejects about 293 kw of thermal energy but requires an effectiveness of about 0.93 to accommodate the maximum cooling regime illustrated in FIG. 3.

To provide maximum cooling on a hot day at low altitude, the configuration of FIG. 2 is modified via appropriate mechanization to achieve the configuration of FIG. 3. Under these conditions, generator 40 must provide about 235 kw of electrical power to motor 100 in addition to the 165 kw of electrical power required for various equipment within cabin 12. As such, generator 40, motor 100, and gear box 38 should be sized accordingly. In this configuration, compressor 68 receives ram air 22 and delivers pressurized air to second inlet and corresponding second outlet of heat exchanger 102, similar to the configuration of FIG. 2. However, the second outlet of heat exchanger 102 is in fluid communication with the inlet of turbine 66 which expands and cools the air prior to entering water separator 62 and passing through inflow port 14 of cabin 12. Fan 76 is used to provide additional air flow through first inlet and outlet of heat exchanger 102 since the pressure differential between cabin 12 and atmosphere is insufficient to provide the necessary heat rejection, approximately 370 kw, by heat exchanger 102. Motor 100 provides about 211 kw of mechanical power to drive compressor 68 via shaft 72. Compressor 68 is also driven via shaft 80 by turbine 66 which provides an additional 181 kw of mechanical power. Fan 76 requires about 2 kw of electrical power which is incorporated into the power demand of the cabin equipment.

As such, the environmental control system illustrated in FIGS. 2 and 3 includes compressor 68 which receives ram air 22 through a compressor inlet to provide compressed air at the compressor outlet. Heat exchanger 102 includes a first inlet and corresponding first outlet for cooling air from compressor 68 which passes through a second inlet and corresponding second outlet. The first inlet of heat exchanger 102 is in fluid communication with outflow port 16 of cabin 12 when the system is in the maximum cooling mode while being in communication with the outlet of turbine 66 when the system is in the maximum economy mode. Turbine 66 is mechanically coupled to compressor 68 and includes an inlet in fluid communication with the second outlet port of heat exchanger 102 when the system is in the maximum cooling mode and in fluid communication with outflow port 16 when the system is in the maximum economy mode. Turbine 66 also includes an outlet in communication with inflow port 14 of cabin 12 when the system is in the maximum cooling mode, but in fluid communication with the second inlet of heat exchanger 102 when the system is in the economy mode. As such, heat exchanger 102 recovers available energy from air exhausted through outflow port 16 to cool air supplied to cabin 12 through inflow port 14. This configuration includes motor 100 which is mechanically coupled to compressor 68 for driving the compressor while functioning in both the maximum cooling mode and the economy mode.

Figure 4:
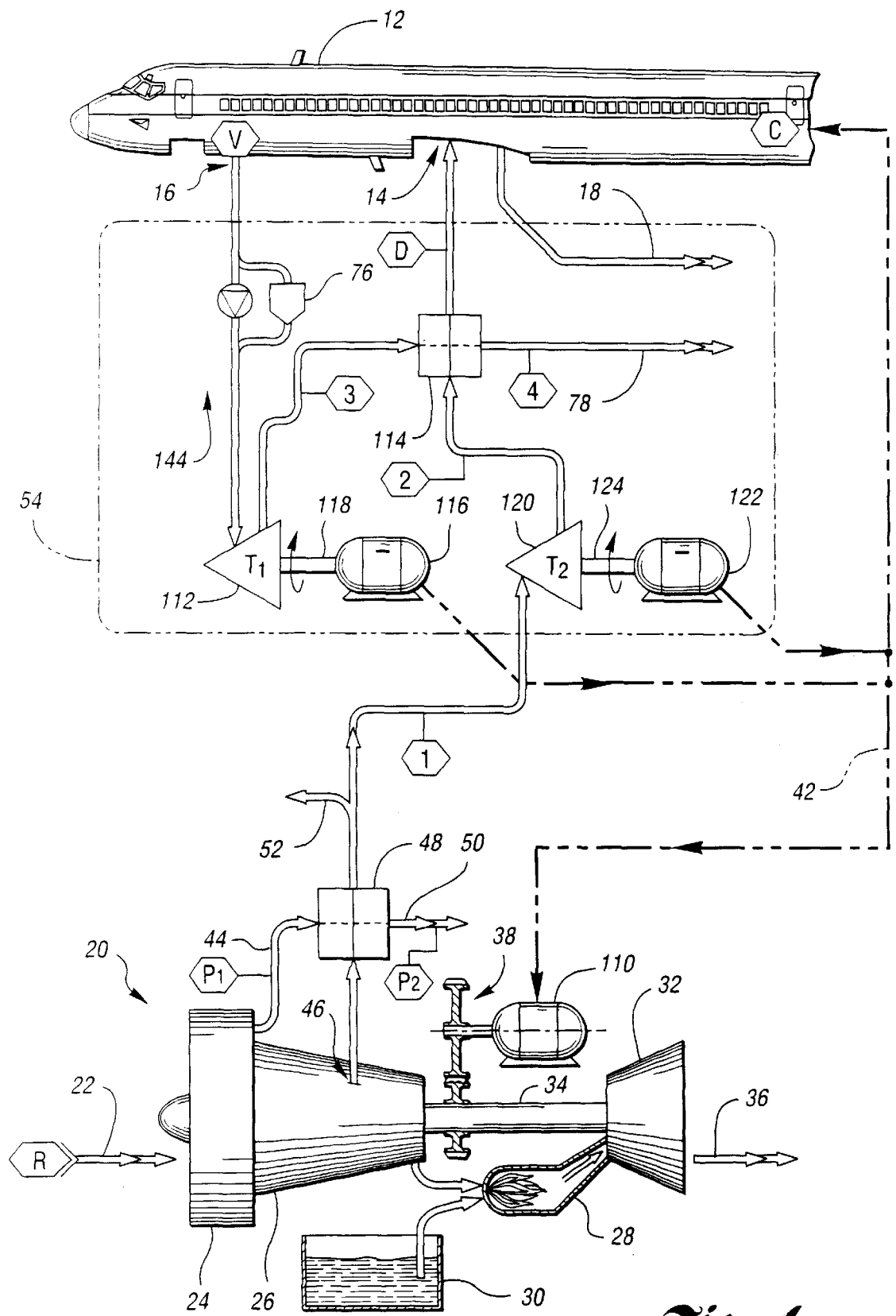
FIG. 4 is a schematic block diagram illustrating an ECS configuration using an outflow turbine and bleed turbine to drive corresponding generators.

Referring now to FIG. 4, another embodiment of an environmental control system according to the present invention is shown. The hexagons of FIG. 4 are used to identify representative values for temperatures and pressures of air at various points throughout the system as summarized in Table 1 below.

TABLE 1

FULL BLEED FLOW CONFIGURATION 43,000 FEET CRUISE

| Symbol | P (psia) | T (°R) |
|---|---|---|
| 1 | 29.3 | 856.9 |
| 2 | 13.7 | 725.4 |
| 3 | 3.38 | 402.1 |
| 4 | 2.35 | 649.1 |
| A | 2.35 | 416.3 |
| C | 10.92 | 535.0 |
| D | 11.45 | 520.0 |
| $P_1$ | 4.78 | 503.9 |
| $P_2$ | 4.67 | 929.8 |
| V | 10.85 | 520.0 |

As indicated in Table 1, this configuration may be referred to as a "full bleed flow configuration". This arrangement provides electrical recovery of both outflow air and bleed air energy which is eventually converted back to mechanical energy provided to engine 20 through a motor 110. In this configuration, a first turbine 112 is interposed cabin 12 and heat exchanger 114 such that the inlet of turbine 112 is in fluid communication with outflow port 16 of cabin 12, while the outlet of turbine 112 is in fluid communication with the first inlet and corresponding first outlet of heat exchanger 114. Turbine 112 expands and cools air exhausted from cabin 12 to further cool air passing through second inlet and corresponding second outlet of heat exchanger 114 prior to entering inflow port 14 of cabin 12. Turbine 112 is mechanically coupled to an electric generator 116 via shaft 118 to convert about 145 kw of mechanical power to about 131 kw of electrical power, assuming an efficiency of about 90%. The electrical power is used to supply the power requirements for cabin 12 while excess power is fed to motor 110 to help drive compressor 26 via shaft 34 and gear box 38. A second turbine 120 receives bleed air from bleed port 46 of engine 20. Turbine 120 is mechanically coupled to generator 122 to convert mechanical energy from the turbine to electrical energy for cabin 12 and/or motor 110. Assuming the representative numbers provided in Table 1, turbine 120 provides approximately 200 kw of mechanical power to generator 122 via shaft 124 which is converted to about 180 kw of electrical power. Air exiting the outlet of turbine 120 passes through the second inlet and corresponding second outlet of heat exchanger 114 prior to entering cabin 12 through inflow port 14. Based on the representative numbers provided in Table 1, the effectiveness of the heat exchanger 114 should be about 0.76.

As with the embodiments illustrated in FIGS. 1–3, heat exchanger 114 is preferably a cross-flow, non-mixing, air-to-air heat exchanger. While not specifically illustrated, this embodiment also includes a water separator placed between heat exchanger 114 and inflow port 14 of cabin 12.

Based on the representative numbers of Table 1, the configuration of FIG. 4 indicates a potential fuel savings of about 0.91% SFC for a typical application cruising at 43,000 feet altitude.

Figure 5:
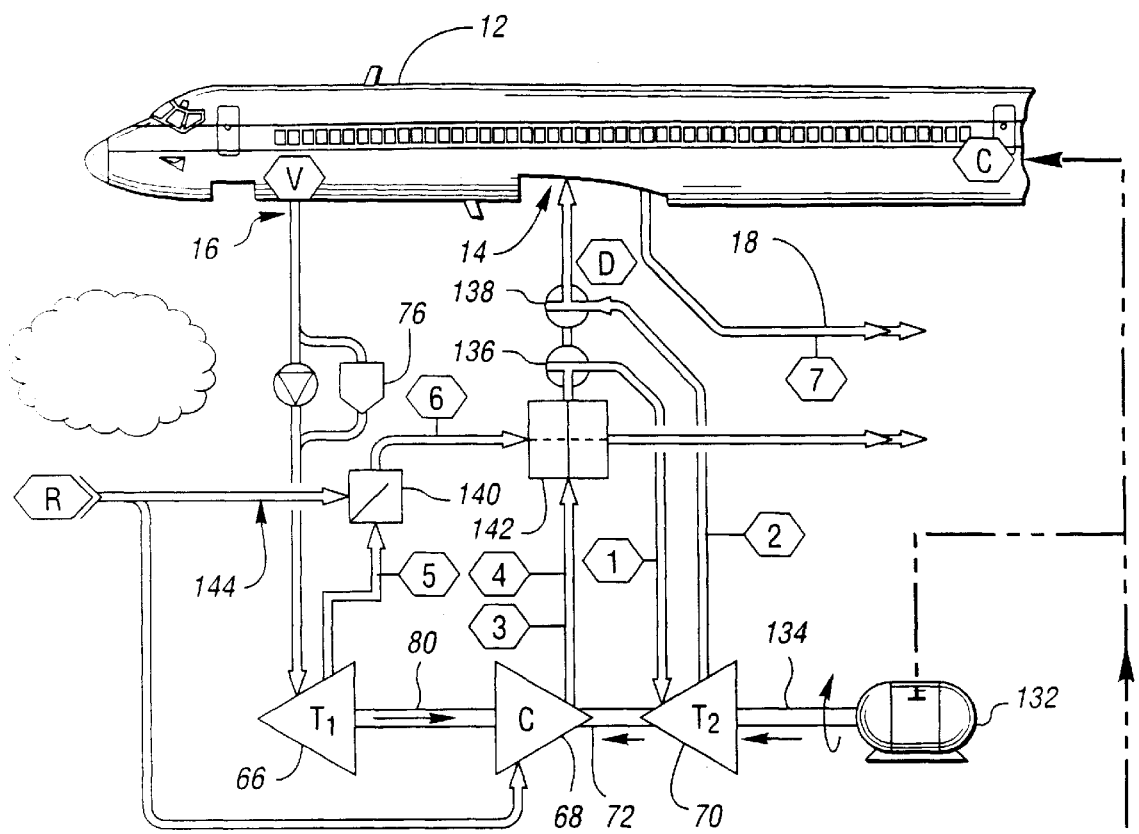
FIG. 5 illustrates another alternative configuration using an outflow turbine, ram air compressor, and a second turbine and motor to drive the compressor in an all-electric configuration.
Figure 5:
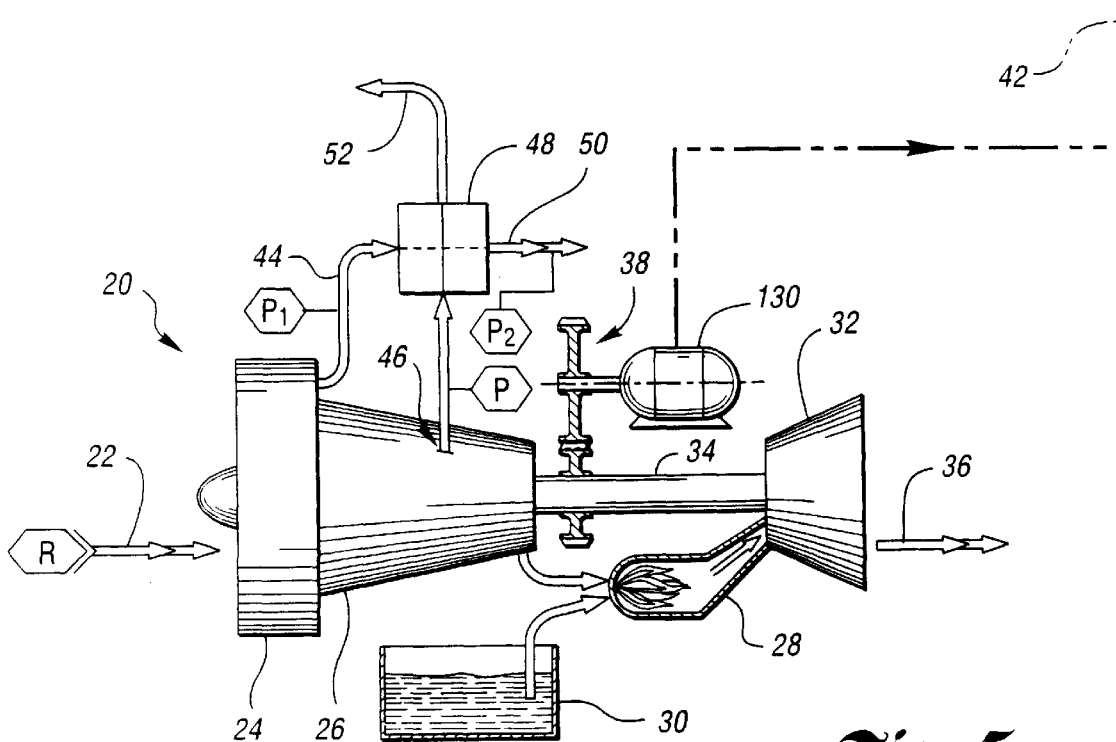

Referring now to FIG. 5, another embodiment of an environmental control system according to the present invention is shown. The configuration of FIG. 5 is an alternate all-electric configuration which does not use bleed air for the ECS function. While pre-cooler 48 of FIG. 4 appears schematically identical to pre-cooler 48 of FIGS. 1–4, the pre-cooler of FIG. 5 provides less heat rejection since the bleed air has been eliminated from the ECS function. As such, bleed air through pre-cooler 48 of FIG. 5 is provided only for the anti-ice function, indicated generally by reference numeral 52. Generator 130 converts about 445 kw of mechanical power to about 400 kw of electrical power to supply 165 kw of electrical power to cabin 12 and about 235 kw of electrical power to motor 132. Turbine 70 is mechanically coupled and driven by motor 132 via shaft 134. Turbine 70 is also mechanically coupled to compressor 68 via shaft 72. A first directional valve 136 operates in conjunction with a second directional valve 138 to selectively place turbine 70 in fluid communication with heat exchanger 142. This provides additional cooling in a maximum cooling mode where energy recovery from the outflow air is insufficient to meet the cooling requirements for cabin 12.

As also illustrated in FIG. 5, a mixing valve 140 is provided to supply ram air via path 144 to heat exchanger 142 where necessary. The ram air is combined with air exhausted from the outlet of turbine 66 prior to passing through heat exchanger 142. To improve efficiency of the ECS when cooling demand is lower, directional control valves 136 and 138 are actuated to remove turbine 70 from the flow path. As such, heat exchanger 142 is in fluid communication with inflow port 14 of cabin 12 through a water separator (not specifically illustrated). As with FIG. 4, representative numbers for the various states indicated by the hexagons of FIG. 5 are summarized in Table 2 below.

TABLE 2

ALL ELECTRIC CONFIGURATION

| Symbol | SEA LEVEL CLIMB | | 43,000 FEET CRUISE | |
|---|---|---|---|---|
| | P (psia) | T (°R) | P (psia) | T (°R) |
| 1 | 37.0 | 588 | — | — |
| 2 | 17.1 | 495 | — | — |
| 3 | 38.0 | 778.0 | 13.22 | 734.2 |
| 4 | 38.0 | 778.0 | 13.22 | 734.2 |
| 5 | | 572.4 | | 371.8 |
| 6 | | 572.4 | | 371.8 |
| 7 | | 762.8 | | 665.6 |
| A | 14.7 | 562.7 | 2.35 | 416.3 |
| C | 14.7 | 535 | 10.92 | 535 |
| D | 17.1 | 495 | 12.22 | 483.6 |
| P | 125.7 | 1119.1 | 34.82 | 999.5 |
| $P_1$ | 19.27 | 640.0 | 4.70 | 503.9 |
| $P_2$ | 17.14 | 754.2 | 4.67 | 929.8 |
| R | 16.22 | 578.8 | 3.66 | 472.7 |
| V | 14.63 | 570 | | |

Figure 6:
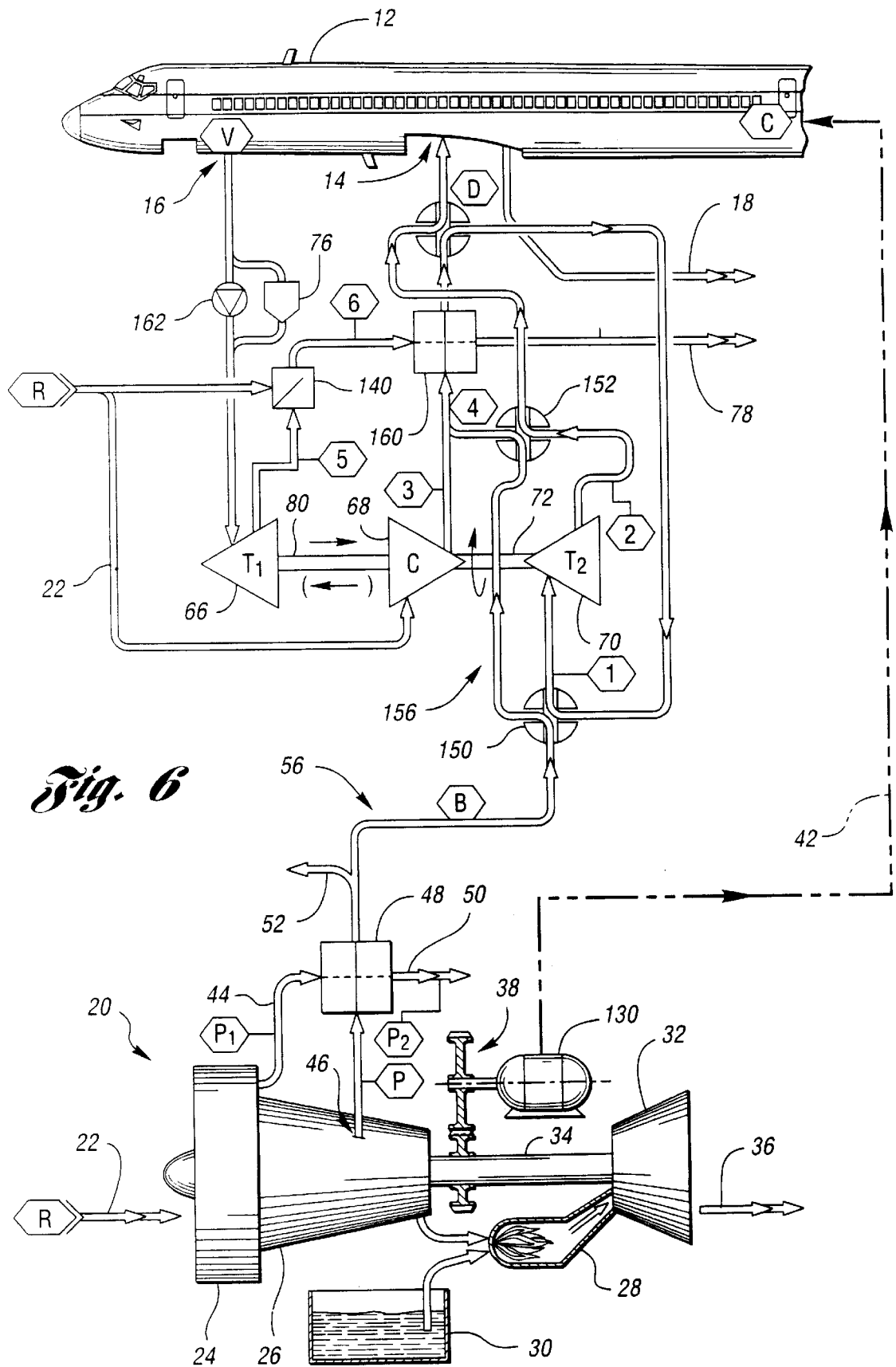
FIG. 6 illustrates an alternative minimum bleed configuration using switch dampers to alter the configuration based on cooling demand.
Figure 7:
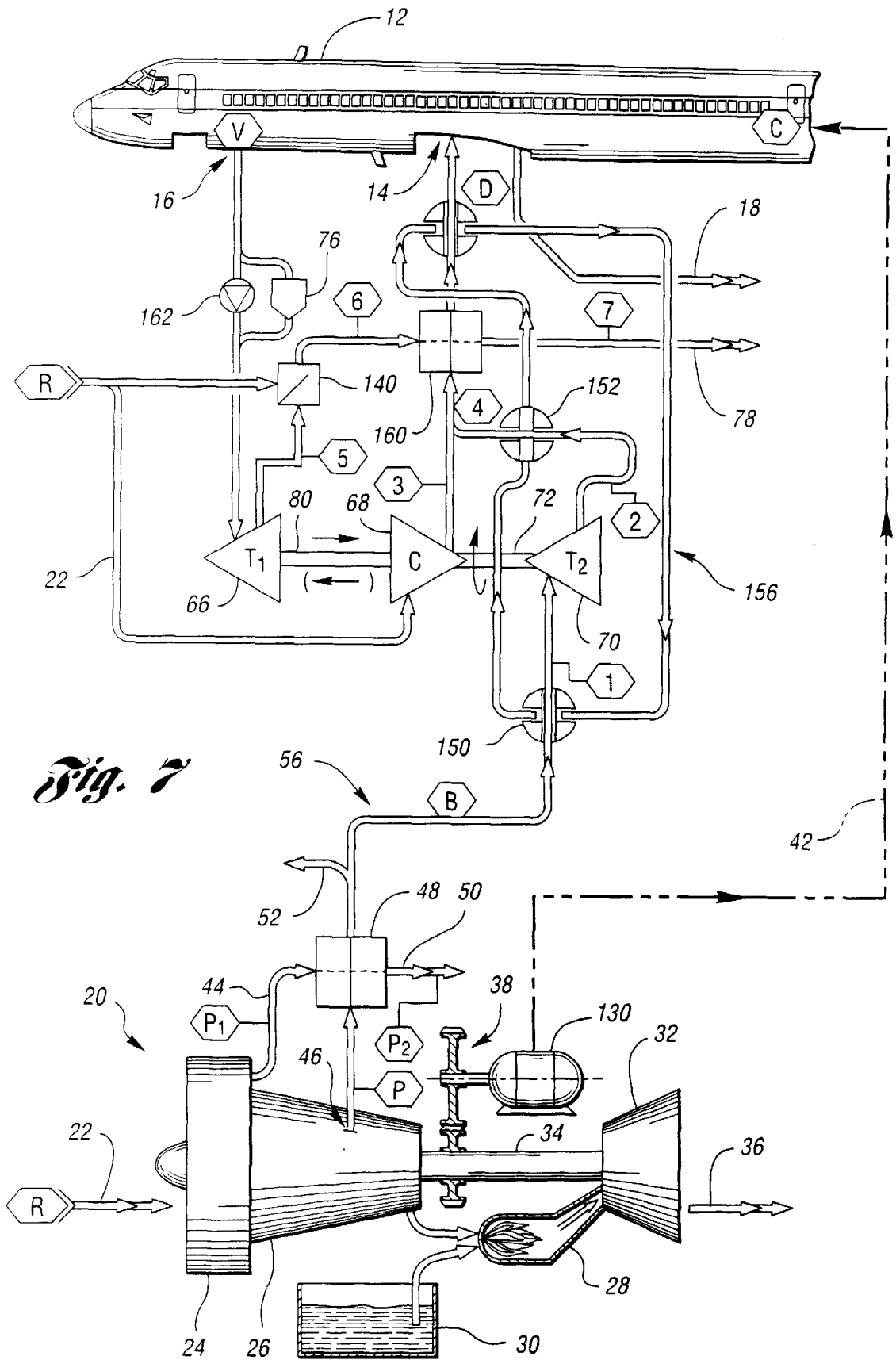
FIG. 7 illustrates a minimum bleed configuration using switch dampers in a maximum economy mode.

Referring now to FIGS. 6 and 7, another embodiment of an environmental control system according to the present invention is shown. FIG. 6 illustrates the flow path for a maximum cooling mode of operation while FIG. 7 illustrates the flow path for a maximum economy mode of operation. The flow path is altered using one or more switch dampers such as first switch damper 150, second switch damper 152, and third switch damper 154. Representative numbers for pressures and temperatures throughout the system are indicated by the hexagons in the Figures and summarized below in Table 3 for various operating conditions.

TABLE 3

MINIMUM BLEED AIR CONFIGURATION PRESSURES AND TEMPERATURES

| Symbol | SEA LEVEL CLIMB | | 43,000 FEET CRUISE MAX ECONOMY | | 43,000 FEET CRUISE | |
|---|---|---|---|---|---|---|
| | P (psia) | T (°R) | P (psia) | T (°R) | P (psia) | T (°R) |
| 1 | 56.6 | 642.7 | 29.26 | 856.9 | 34.82 | 999.5 |
| 2 | 17.3 | 495.0 | 13.22 | 717.7 | 13.22 | 806.2 |
| 3 | 57.6 | 894.4 | 13.22 | 734.2 | 13.22 | 734.2 |
| 4 | 57.6 | 842.6 | 728.2 | 13.22 | 13.22 | 757.5 |
| 5 | 14.9 | 572.4 | 2.55 | 372.8 | 2.55 | 371.8 |
| 6 | 14.9 | 572.4 | 2.55 | 371.8 | 2.55 | 371.8 |
| 7 | | 772.8 | | 666.1 | | 657.5 |
| A | 14.7 | 562.6 | 2.35 | 416.3 | 2.35 | 416.3 |
| B | 57.60 | 798.4 | 29.26 | 856.9 | 34.82 | 999.5 |
| C | 14.78 | 535 | 10.92 | 535 | 10.92 | 535 |
| D | 17.10 | 41.07 | 12.22 | 483.6 | 12.24 | 520 |
| P | 125.7 | 1119.1 | 34.82 | 999.5 | 34.82 | 999.5 |
| $P_1$ | 19.27 | 640.0 | 4.78 | 503.9 | 4.78 | 503.9 |
| $P_2$ | 17.14 | 754.2 | 4.67 | 929.8 | 4.67 | 92.95 |
| R | 16.22 | 578.8 | 3.66 | 472.7 | 3.665 | 472.6 |
| V | 14.63 | 570 | 10.85 | 510 | 10.85 | 5.0 |

As illustrated in FIGS. 6 and 7, switch dampers 150, 152 and 154 are used to selectively couple the inlet of turbine 70 either directly to the bleed air from engine 20 or to the second outlet of heat exchanger 160. At the same time, the switch dampers also selectively couple the outlet of turbine 70 to either inflow port 14 of cabin 12 or the second inlet port of heat exchanger 160. Otherwise, the configuration illustrated in FIGS. 6 and 7 is similar to the minimum bleed configuration illustrated in FIG. 1. The switch dampers function to reroute the flows such that, when needed, the bleed and compressed ram flows can be combined and then pre-cooled in heat exchanger 160. Further expansion through turbine 70 brings the temperature down to the 35° F. needed to support the water separation function performed by a water separator (not specifically illustrated). The switch dampers are needed only for the infrequent low-altitude and ground-cooling modes such that they are designed to be low loss devices when in the "straight-through" mode illustrated in FIG. 7.

Fan 76 is shown in parallel with a check valve 162 to accommodate those cases where the cabin pressure is insufficient to support the exhaust of conditioned air from cabin 12. Depending upon the particular application, the air driven by fan 76 may bypass turbine 66.

For all the embodiments illustrated and described which utilize a turbine in fluid communication with the outflow port 16 of cabin 12, every attempt should be made to make the turbine variable or controllable to provide a means of regulating the outflow rate at a particular pressure condition so as to regulate the rate of change of cabin pressure for a given inflow rate from the one or more packs. This may be accomplished by using adjustable or controllable inlet guide vanes or first-stage stator blades in the turbine. In an ideal case, such an arrangement makes an outflow valve unnecessary. However, an outflow valve may be provided in parallel to pass a small, variable amount of air to the ambient to accomplish cabin pressure control. Use of the outflow valve should be minimized, however, since any air exhausted through the outflow valve represents lost work.

While embodiments of the invention have been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. An environmental control system for a pressurized cabin having an inflow port for supplying air to the cabin and an outflow port fo exhausting air from the cabin, the system comprising:

a heat exchanger having a first inlet and corresponding first outlet in fluid communication with the outflow port of the cabin, the heat exchanger also having a second inlet and corresponding second outlet in fluid communication with the inflow port of the cabin, wherein air exhausted from the cabin passes through the first inlet and outlet of the heat exchanger to cool air supplied to the cabin through the second inlet and outlet to increase efficiency of the system;

a turbine interposed the cabin and heat exchanger having a turbine inlet in fluid communication with the outflow port of the cabin and a turbine outlet in fluid communication with the first inlet of the heat exchanger, the turbine expanding and cooling the air exhausted from the cabin to further cool the air supplied to the cabin;

a second turbine having an inlet for receiving bleed air from at least one engine and an outlet in fluid communication with the second inlet of the heat exchanger; and a generator coupled to the second turbine for converting mechanical energy from the second turbine to electrical energy for the cabin.

2. An environmental control system for a pressurized cabin having an inflow port for supplying air to the cabin and an outflow port for exhausting air from the cabin, the system comprising:

a heat exchanger having a first inlet and corresponding first outlet in fluid communication with the outflow port of the cabin, the heat exchanger also having a second inlet and correspondig second outlet in fluid communication with the inflow port of the cabin, wherein air exhausted from the cabin passes through the first inlet and outlet of the heat exchanger to cool air supplied to the cabin through the second inlet and outlet to increase efficiency of the system;

a turbine interposed the cabin and heat exchanger having a turbine inlet in fluid communication with the outflow port of the cabin and a turbine outlet in fluid communication with the first inlet of the heat exchanger, the turbine expanding and cooling the air exhausted from the cabin to further cool the air supplied to the cabin; and a generator coupled to the turbine for converting mechanical energy from the turbine to electrical energy for the cabin.

3. An environmental control system for a pressurized cabin having an inflow port for supplying air to the cabin and an outflow port for exhausting air from the cabin, the system comprising:

a heat exchanger having a first inlet and corresponding first outlet in fluid communication with the outflow port of the cabin, the heat exchanger also having a second inlet and corresponding second outlet in fluid communication with the inflow port of the cabin, wherein air exhausted from the cabin passes through the first inlet and outlet of the heat exchanger to cool air supplied to the cabin through the second inlet and outlet to increase efficiency of the system;

a fan interposed the first inlet of the heat exchanger and the outflow port of the cabin for moving air through the heat exchanger when cabin pressure is insufficient to attain a desired cooling level of air supplied to the inflow port of the cabin; and a turbine interposed the cabin and heat exchanger having a turbine inlet in fluid communication with the outflow port of the cabin and a turbine outlet in fluid communication with the first inlet of the heat exchanger, the turbine expanding and cooling the air exhausted from the cabin to further cool the air supplied to the cabin.

4. The system of claim 1 further comprising:

a compressor mechanically coupled to and driven by the turbine, the compressor receiving ram air through a compressor inlet and compressing the ram air to provide compressed air at a compressor outlet, the compressor outlet being in fluid communication with the second inlet of the heat exchanger.

5. The system of claim 4 further comprising:

a motor coupled to the compressor for providing energy to drive the compressor.

6. The system of claim 4 further comprising:

a second turbine mechanically coupled to the compressor for providing energy to drive the compressor, the second turbine having an inlet for receiving bleed air from at least one engine and an outlet in fluid communication with the second inlet of the heat exchanger.

7. An environmental control system for a vehicle powered by at least one turbine engine, the vehicle including a cabin having an inflow port for receiving conditioned air and an outflow port for exhausting air, the system comprising:

a first turbine having an inlet in fluid communication with the outflow port of the cabin, the first turbine expanding and cooling the air exhausted from the cabin, the air exiting the first turbine through an outlet;

a heat exchanger having a first inlet and corresponding first outlet in fluid communication with the outlet of the first turbine for cooling air passing through a second inlet and corresponding second outlet prior to entering the inflow port of the cabin;

a compressor mechanically coupled to and driven by the first turbine, the compressor receiving ram air through a compressor inlet to provide compressed air at a compressor outlet, the compressor outlet being in fluid communication with the second inlet of the heat exchanger;

a second turbine mechanically coupled to the compressor for providing energy to drive the compressor, the second turbine having an inlet receiving bleed air from the engine and an outlet providing conditioned air to the cabin; and at least one switch damper for selectively coupling the inlet of the second turbine either directly to the bleed air from the engine or to the second outlet of the heat exchanger and for selectively coupling the outlet of the second turbine to either the inflow port of the cabin or the second inlet port of the heat exchanger.

8. The system of claim 7 further comprising:

a fan interposed the outflow port of the cabin and the inlet of the first turbine for selectively moving air through the first turbine and the heat exchanger when a reduced pressure ratio across the turbine provides insufficient air movement.

9. The system of claim 8 further comprising a motor coupled to the second turbine and the compressor to provide additional energy to drive the compressor.

10. The system of claim 7 wherein at least one switch damper comprises:

a first switch damper interposed the engine and the second turbine having a first selectable state for coupling bleed air from the engine to the inlet of the second turbine and a second selectable state for coupling bleed air from the engine to the outlet of the compressor and the second outlet of the heat exchanger to the inlet of the second turbine;

a second switch damper interposed the first switch damper and the compressor having a first selectable state for coupling the outlet of the second turbine to the outlet of the compressor and a second selectable state for coupling the bleed air from the engine to the outlet of the compressor and the outlet of the second turbine to the inflow port of the cabin; and a third switch damper interposed the heat exchanger and the cabin having a first selectable state for coupling the second outlet of the heat exchanger to the inflow port of the cabin and a second state for coupling the outlet of the second turbine to the inflow port of the cabin and the second outlet of the heat exchanger to the inlet of the second turbine.

11. The system of claim 7 further comprising:

a switch damper interposed the first turbine and the heat exchanger having a first selectable position for coupling the outlet of the first turbine to the first inlet of the heat exchanger and a second selectable position for coupling ram air to the first inlet of the heat exchanger.

12. An environmental control system for an aircraft powered by at least one turbine engine, the aircraft including a cabin having an inflow port for receiving conditioned air and an outflow port for exhausting air, the system comprising:

a first turbine having an inlet in fluid communication with the outflow port of the cabin, the first turbine expanding and cooling the air exhausted from the cabin, the air exiting the first turbine through an outlet;

a heat exchanger having a first inlet and corresponding first outlet in fluid communication with the outlet of the first turbine for cooling air passing through a second inlet and corresponding second outlet prior to entering the inflow port of the cabin;

a compressor mechanically coupled to and driven by the first turbine, the compressor receiving ram air through a compressor inlet to provide compressed air at a compressor outlet, the compressor outlet being in fluid communication with the second inlet of the heat exchanger;

a second turbine selectively coupled to the compressor having an inlet selectively coupled to the second outlet of the heat exchanger and an outlet selectively coupled to the inflow port of the cabin;

a motor selectively coupled to the second turbine and coupled to the compressor for providing driving energy to the compressor;

a first directional valve interposed the heat exchanger and the inflow port of the cabin for selectably coupling the second outlet of the heat exchanger to either the inlet of the second turbine or the inflow port of the cabin; and a second directional valve interposed the first directional valve and the inflow port of the cabin for selectably coupling either the outlet of the second turbine or the second outlet of the heat exchanger to the inflow port of the cabin.

13. The system of claim 12 further comprising:

a fan interposed the outflow port of the cabin and the inlet of the first turbine for selectively moving air through the first turbine and the heat exchanger when a reduced pressure ratio across the turbine provides insufficient air movement.

14. The system of claim 12 further comprising:

a mixing valve interposed the outlet of the first turbine and the first inlet of the heat exchanger for selectively mixing ram air with air exiting the outlet of the first turbine.

15. An environmental control system for an aircraft powered by at least one turbine engine, the aircraft including a cabin having an inflow port for receiving air supplied to the cabin and an outflow port for exhausting air from the cabin, the system having a maximum cooling mode and an economy mode, the system comprising:

a compressor receiving ram air through a compressor inlet to provide compressed air at a compressor outlet;

a heat exchanger having a first inlet and corresponding first outlet for cooling air passing through a second inlet and corresponding second outlet, the first inlet being in fluid communication with the outflow port of the cabin when in the maximum cooling mode; and a first turbine mechanically coupled to the compressor, the first turbine having an inlet in fluid communication with the second outlet port of the heat exchanger when in the maximum cooling mode and in fluid communication with the outflow port when in the economy mode, the first turbine also having an outlet in communication with the inflow port of the cabin when in the maximum cooling mode, the outlet being in fluid communication with the second inlet of the heat exchanger when in the economy mode, wherein the heat exchanger recovers energy from air exhausted from the cabin to cool air supplied to the cabin.

16. The system of claim 15 further comprising a second turbine selectively mechanically coupled to the compressor when functioning in the economy mode, the second turbine having an inlet receiving bleed air from the engine and an outlet in fluid communication with the outlet of the compressor when functioning in the economy mode.

17. The system of claim 15 further comprising a motor mechanically coupled to the compressor for driving the compressor while functioning in both the maximum cooling mode and the economy mode.

* * * * *